(12) United States Patent
Kato

(10) Patent No.: US 12,085,139 B2
(45) Date of Patent: *Sep. 10, 2024

(54) LUBRICANT COMPOSITION FOR SHOCK ABSORBERS, SHOCK ABSORBER, AND METHOD FOR ADJUSTING FRICTION OF LUBRICANT FOR SHOCK ABSORBERS

(71) Applicant: KYB Corporation, Tokyo (JP)

(72) Inventor: Shinji Kato, Tokyo (JP)

(73) Assignee: KYB CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/766,508

(22) PCT Filed: Jul. 3, 2020

(86) PCT No.: PCT/JP2020/026147
§ 371 (c)(1),
(2) Date: Apr. 4, 2022

(87) PCT Pub. No.: WO2021/070433
PCT Pub. Date: Apr. 15, 2021

(65) Prior Publication Data
US 2024/0084869 A1      Mar. 14, 2024

(30) Foreign Application Priority Data

Oct. 11, 2019   (JP) .................. 2019-187393

(51) Int. Cl.
*F16F 9/32*     (2006.01)
*C10M 125/24*   (2006.01)
*C10M 129/74*   (2006.01)

(52) U.S. Cl.
CPC ......... *F16F 9/3278* (2013.01); *C10M 125/24* (2013.01); *C10M 129/74* (2013.01);
(Continued)

(58) Field of Classification Search
CPC .. F16F 9/3278; F16F 2230/04; F16F 2224/04; C10N 2040/08; C10N 2030/06;
(Continued)

(56) References Cited

U.S. PATENT DOCUMENTS

2004/0013882 A1   1/2004   Gorny et al.
2011/0306526 A1   12/2011  Germanaud et al.
(Continued)

FOREIGN PATENT DOCUMENTS

JP   2004-42640 A   2/2004
JP   2007-99986 A   4/2007
(Continued)

OTHER PUBLICATIONS

Nakanishi, H., Technical Trends and Tribology of Shock Absorber, Tribologist, 2009, vol. 54, No. 9, p. 598-603, with partial English translation, cited in the specification. (8 pages).
(Continued)

*Primary Examiner* — Vishal V Vasisth
(74) *Attorney, Agent, or Firm* — WHDA, LLP

(57) ABSTRACT

To provide a lubricant composition for shock absorbers, a shock absorber, and a method for adjusting the friction of a lubricant composition for shock absorbers, each capable of satisfying both operational stability and ride comfort particularly at the time of a minute amplitude. The lubricant composition for shock absorbers contains a base oil and a friction adjusting agent, wherein the friction adjusting agent contains a pentaerythritol ester, the pentaerythritol ester contains a pentaerythritol tetraester at the highest proportion or in an amount of 50 mass % or more, and the pentaerythritol ester content is 0.5 mass % or more.

8 Claims, 7 Drawing Sheets

(52) U.S. Cl.
CPC . *C10M 2201/085* (2013.01); *C10M 2207/282* (2013.01); *F16F 2230/04* (2013.01)

(58) Field of Classification Search
CPC ............ C10N 2010/04; C10M 171/00; C10M 129/76; C10M 129/74; C10M 169/04; C10M 2207/289; C10M 2207/2835; C10M 2203/003; C10M 2207/283; C10M 2223/045
See application file for complete search history.

(56) References Cited

U.S. PATENT DOCUMENTS

| | | |
|---|---|---|
| 2014/0343316 A1 | 11/2014 | Theyson |
| 2015/0038384 A1 | 2/2015 | Sakanoue |
| 2015/0184107 A1 | 7/2015 | Sakanoue et al. |
| 2016/0369200 A1* | 12/2016 | Sakanoue ............ C10M 141/10 |

FOREIGN PATENT DOCUMENTS

| | | |
|---|---|---|
| JP | 2012-511077 A | 5/2012 |
| JP | 2012-224653 A | 11/2012 |
| JP | 2013-199535 A | 10/2013 |
| JP | 2014-19713 A | 2/2014 |
| WO | 2018/124873 A1 | 7/2018 |

OTHER PUBLICATIONS

International Search Report dated Sep. 15, 2020, issued in counterpart Application No. PCT/JP2020/026147. (3 pages).
Written Opinion dated Nov. 9, 2021, issued in counterpart Application No. PCT/JP2020/026147. (8 pages).
Written Opinion dated Nov. 9, 2021, issued in counterpart Application No. PCT/JP2020/026147. (13 pages).
Written Opinion dated Nov. 9, 2021, issued in counterpart Application No. PCT/JP2020/026147. (5 pages).

* cited by examiner (A)  (B)  (C)

(D)  (E)  (F)

Amplitude-dependent index = $\mu 2 / \mu 1$

LUBRICANT COMPOSITION FOR SHOCK ABSORBERS, SHOCK ABSORBER, AND METHOD FOR ADJUSTING FRICTION OF LUBRICANT FOR SHOCK ABSORBERS

This application is a 371 of PCT/JP2020/026147, filed Jul. 3, 2020.

TECHNICAL FIELD

The present invention relates to a lubricant composition for shock absorbers, a shock absorber, and a method for adjusting the friction of a lubricant for shock absorbers.

BACKGROUND ART

It is conventionally known that the vibration damping force of a shock absorber is the sum of a hydraulic damping force generated at a valve and a friction force generated at a sliding part between a piston rod and an oil seal or between a piston and a cylinder. It is also known that when the vibration damping force of a shock absorber is large, operational stability increases but ride comfort worsens; conversely, when the vibration damping force of a shock absorber is small, operational stability worsens but ride comfort gets better. In recent years, therefore, studies have been made focusing on ride comfort to decrease the friction force of a lubricant for shock absorbers and decrease the vibration damping force of a shock absorber by adjusting a friction adjusting agent to be added to the lubricant for shock absorbers (for example, Non-Patent Document 1).

PRIOR ART DOCUMENT

Non-Patent Document

Non-Patent Document 1: Technical Trends and Tribology of Shock Absorber (Hiroshi Nakanishi, Tribologist, 2009 (Vol. 54), No. 9, page 598).

Technical Problem

SUMMARY

Shock absorbers exhibit their vibration damping force by reciprocating motion. It takes a certain amount of time for their hydraulic damping force to start up, while a friction force is highly responsive so that at the time of transition from a stationary state to a sliding state or at the time of a minute amplitude, the friction force becomes an important factor of the vibration damping force of shock absorbers. A reduction in the friction force of a lubricant for shock absorbers to give priority to ride comfort as in the past however leads to a decrease in vibration damping force and a deterioration in operational stability. Particularly in recent years, many roads are in good condition and vibrations with a minute amplitude occur more than those with a normal amplitude, so that there is a demand for the development of a lubricant composition for shock absorbers capable of satisfying both operational stability and ride comfort at the time of a minute amplitude.

An object of the present invention is to provide a lubricant composition for shock absorbers, a shock absorber, and a method for adjusting the friction of a lubricant for shock absorbers, each capable of satisfying both operational stability and ride comfort particularly at the time of a minute amplitude.

Solution to Problem

One aspect of the present invention is a lubricant composition for shock absorbers according to the following (1) to (8).
(1) A lubricant composition for shock absorbers, containing a base oil and a friction adjusting agent, wherein the friction adjusting agent contains a pentaerythritol ester, the pentaerythritol ester contains a pentaerythritol tetraester at the largest proportion or in an amount of 50 mass % or more, and a content of the pentaerythritol ester is 0.5 mass % or more.
(2) A lubricant composition for shock absorbers, containing a base oil and a friction adjusting agent, wherein the friction adjusting agent contains a pentaerythritol ester, the pentaerythritol ester has an average number of an ester group of more than 3, and a content of the pentaerythritol ester is 0.5 mass % or more.
(3) A lubricant composition for shock absorbers, containing a base oil and a friction adjusting agent, wherein the friction adjusting agent contains a pentaerythritol ester, the pentaerythritol ester has an average number of a hydroxyl group of less than 1, and a content of the pentaerythritol ester is 0.5 mass % or more.
(4) A lubricant composition for shock absorbers, containing a base oil and a friction adjusting agent, wherein the friction adjusting agent contains a pentaerythritol ester and a ratio of a friction coefficient $\mu 2$ at the time of a minute amplitude and a friction coefficient $\mu 1$ at the time of a normal amplitude ($\mu 2/\mu 1$) is 0.8 or more.
(5) A lubricant composition for shock absorbers, containing a base oil and a friction adjusting agent, wherein the friction adjusting agent contains a pentaerythritol ester and a friction coefficient $\mu 3$ of a lubricant immediately before sliding is stopped or immediately after sliding is started is larger than a friction coefficient $\mu 4$ of the lubricant in a sliding state.
(6) The lubricant composition for shock absorbers as described in any of (1) to (5), wherein a hydroxyl value is 0.5 mgKOH/g or more.
(7) The lubricant composition for shock absorbers as described in any of (1) to (6), wherein a content of the pentaerythritol ester is 5 mass % or more.
(8) The lubricant composition for shock absorbers as described in any of (1) to (7), wherein the friction adjusting agent further contains zinc dithiophosphate.

Solution to Problem

Another aspect of the present invention is a shock absorber according to the following (9).
(9) A shock absorber using the lubricant composition for shock absorbers as described in any of (1) to (8).

Further aspect of the present invention is a method for adjusting the friction of a lubricant for shock absorbers according to the following (10) to (13).
(10) A method for adjusting the friction of a lubricant for shock absorbers containing a base oil and a pentaerythritol ester, including adjusting the average number of an ester group of the pentaerythritol ester to control friction characteristics at the time of a minute amplitude.
(11) A method for adjusting the friction of a lubricant for shock absorbers containing a base oil and a pentaerythritol ester, including adjusting the average number of a hydroxyl group of the pentaerythritol ester to control friction characteristics at the time of a minute amplitude.

(12) A method for adjusting the friction of a lubricant for shock absorbers containing a base oil and a pentaerythritol ester, including adjusting a hydroxyl value of the lubricant for shock absorbers to suppress a decrease in the pentaerythritol ester.

(13) A method for adjusting the friction of a lubricant for shock absorbers containing a base oil and a pentaerythritol ester, including adjusting a carbon number of the fatty acid residue of the pentaerythritol ester to adjust the friction coefficient of the lubricant for shock absorbers.

Advantageous Effects of Invention

The present invention can provide a lubricant composition for shock absorbers, a shock absorber, and a method for adjusting the friction of a lubricant for shock absorbers, each capable of satisfying both operational stability and ride comfort, particularly at the time of a minute amplitude.

DESCRIPTION OF EMBODIMENTS

Figure 1:
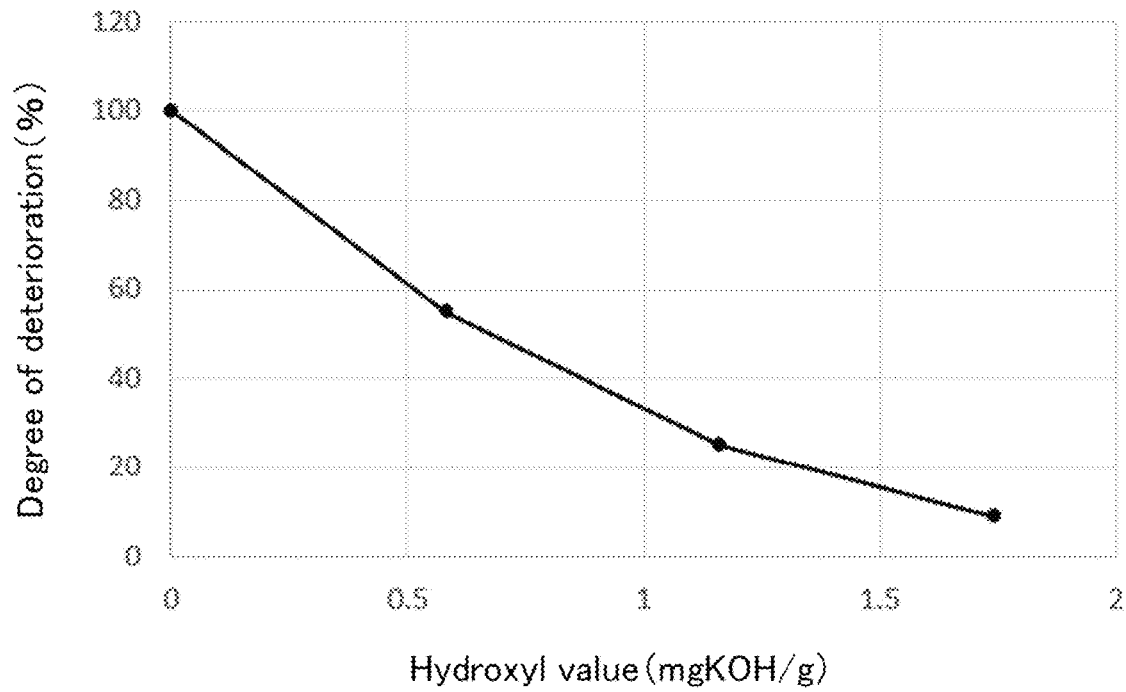
FIG. 1 is a graph showing the relation between the hydroxyl value of a lubricant for shock absorbers and the degree of deterioration of a lubricant for shock absorbers.

The lubricant composition for shock absorbers, a shock absorber, and a method for adjusting the friction of a lubricant for shock absorbers according to the present invention will hereinafter be described based on some drawings. It is to be noted that in the following embodiment, a lubricant composition for shock absorbers will be exemplified to describe the present invention. In addition, terms "at the time of a minute amplitude" or "at the time of a normal amplitude" are used in the following description. In the present invention, the term "at the time of a minute ampli-tude" means an amplitude of ±1.0 mm or less and the term "at the time of a normal amplitude" means an amplitude larger than ±1.0 mm.

The lubricant for shock absorbers according to the present embodiment contains (A) a base oil and (B) a friction adjusting agent and the friction adjusting agent (B) contains (B1) zinc dithiophosphate (which may also be called "ZnDTP" hereinafter) and (B2) pentaerythritol.

(A) Base Oil

The base oil in the lubricant for shock absorbers according to the present embodiment is a mineral oil and/or a synthetic oil. The kind of the mineral oil or synthetic oil is not particularly limited. Examples of the mineral oil include paraffinic mineral oils, intermediate-based mineral oils, and naphthenic mineral oils obtained by a conventional refining method such as solvent refining or hydrotreating. Examples of the synthetic oil include polybutenes, polyolefins [α-olefin (co)polymers], various esters (such as polyol esters, dibasic acid esters, and phosphoric acid esters), various ethers (such as polyphenyl ether), alkylbenzenes, and alkylnaphthalenes. In the present invention, as the base oil, the above-described mineral oils may be used alone or in combination of two or more; the above-described synthetic oils may be used alone or in combination of two or more; or one or more of the mineral oils may be used in combination with one or more of the synthetic oils.

(B) Friction Adjusting Agent

The lubricant for shock absorbers according to the present embodiment contains a friction adjusting agent. Although the friction adjusting agent is not particularly limited, it may contain an anti-friction agent such as phosphorus-, amine-, or ester-based one. The friction coefficient of the lubricant for shock absorbers can be adjusted by adjusting an amount of the anti-friction agent added. The friction adjusting agent according to the present embodiment contains at least (B1) zinc dithiophosphate and (B2) a pentaerythritol ester as described below.

(B1) Zinc Dithiophosphate (ZnDTP)

A ZnDTP is typically a compound represented by the following chemical formula 1 and has a function of assisting the friction adjusting agent to adjust the friction coefficient.

[Chemical formula 2]

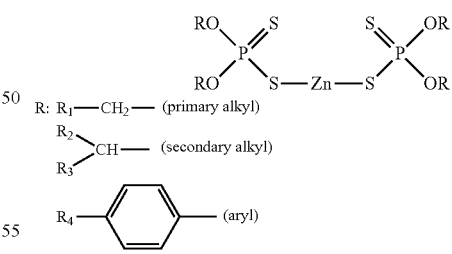

[in the aforesaid chemical formula 1, Rs are each independently a hydrocarbon group and examples include linear primary alkyl groups, branched secondary alkyl groups, and aryl groups].

A plurality of kinds (structures) of ZnDTPs such as those having a primary alkyl group, those having a secondary alkyl group, and those having an aryl group are known, the lubricant for shock absorbers according to the present embodiment contains two kinds of ZnDTPs as described below.

Described specifically, the lubricant for shock absorbers according to the present embodiment contains a ZnDTP represented by the following formula 1 as a first ZnDTP:

[Chemical formula 2]

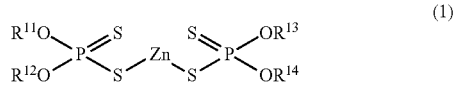

(1)

[in the formula 1, $R^{11}$ to $R^{14}$ are alkyl groups and these alkyl groups have a primary alkyl group and a secondary alkyl group. This means that one or more and three or less of $R^{11}$ to $R^{14}$ is/are a primary alkyl group and the other(s) of $R^{11}$ to $R^{14}$ is/are a secondary alkyl group].

The primary alkyl group of the first ZnDTP is not particularly limited and examples include methyl, ethyl, n-propyl, n-butyl, n-pentyl, n-hexyl, n-heptyl, n-octyl, n-nonyl, n-decyl, isoamyl, isobutyl, 2-methylbutyl, 2-ethylhexyl, 2,3-dimethylbutyl, and 2-methylpentyl groups. The primary alkyl group is preferably a primary alkyl group having from 4 to 12 carbon atoms (such as isobutyl group (having 4 carbon atoms) and 2-ethylhexyl group (having 8 carbon atoms)).

The secondary alkyl group of the first ZnDTP is not particularly limited and examples include isopropyl, sec-butyl, 1-ethylpropyl, and 4-methyl-2-pentyl groups. The secondary alkyl group is preferably a secondary alkyl group having 3 to 6 carbon atoms (such as isopropyl group (having 3 carbon atoms)).

Although a ratio of the primary alkyl group and the secondary alkyl group in the first ZnDTP is not particularly limited, a ratio of the primary alkyl group is preferably higher than a ratio of the secondary alkyl group.

Although the content of the first ZnDTP is not particularly limited, the content of it in the lubricant for shock absorbers is preferably 0.1 mass % or more, more preferably 0.4 mass % or more. In addition, the content of the first ZnDTP in the lubricant for shock absorbers is preferably 4.0 mass % or less, more preferably 2.0 mass % or less.

Thus, the lubricant for shock absorbers according to the present invention containing a friction adjusting agent containing the first ZnDTP having both the primary alkyl group and the secondary alkyl group can easily adjust the friction coefficient to be suited for good ride comfort and operational stability and in addition, as described later (refer to Friction Test 3 and FIG. 12 which will be described later), it can suppress variations in the friction coefficient and provide better ride comfort compared with a lubricant for shock absorbers containing a ZnDTP having only a primary alkyl group and/or a ZnDTP having only a secondary alkyl group.

The lubricant for shock absorbers according to the present embodiment has, as a friction adjusting agent, a second ZnDTP having a structure different from that of the first ZnDTP. The second ZnDTP is represented by the following formula 2:

[Chemical formula 3]

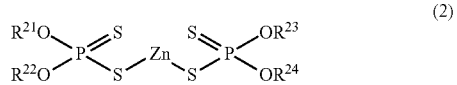

(2)

[in the formula 2, $R^{21}$ to $R^{24}$ are each a secondary alkyl group. This means that the second ZnDTP does not have a primary alkyl group but has only a secondary alkyl group].

The number of the carbon atoms of the secondary alkyl group which the second ZnDTP has is not particularly limited and examples of the secondary alkyl group include isopropyl, sec-butyl, 1-ethylpropyl, 2-ethylhexyl, and 4-methyl-2-pentyl groups. The secondary alkyl group is preferably a secondary alkyl group having 3 to 8 carbon atoms (for example, an isopropyl group (having 3 carbon atoms), a 2-ethylhexyl group (having 8 carbon atoms), or an isobutyl group (having 4 carbon atoms)).

Although the content of the second ZnDTP is not particularly limited, it is preferably smaller than that of the first ZnDTP. It is preferably 20 wt % or less of the amount of the ZnDTPs added (a total amount of the first ZnDTP and the second ZnDTP).

The kind of alkyl group which the ZnDTP contains can be determined by a known measurement method. For example, the structure of the ZnDTP can be determined using $C^{13}$—NMR or the structure of the ZnDTP can be determined by analyzing whether the alkyl group is a primary alkyl group or a secondary alkyl group based on the characteristics of P—O—C absorption bands or P═S and P—S absorption bands by using the fingerprint region of FT-IR.

In addition, when the lubricant contains, as the dithiophosphate, the second ZnDTP having only a secondary alkyl group, it can improve ride comfort more than a lubricant containing only the first ZnDTP. More specifically, the resulting lubricant can reduce the microvibration during running compared with the lubricant containing only the first ZnDTP. Further, by using, as the second ZnDTP, a ZnDTP having a secondary alkyl group with 3 to 8 carbon atoms, a difference in friction coefficient between at the time of a minute amplitude (low speed) and at the time of a normal amplitude (high speed) can be reduced, leading to improved ride comfort.

(B2) Pentaerythritol Ester

A pentaerythritol ester is a tetravalent sugar alcohol and it is a compound in which a hydroxyl group which is a terminal substituent of pentaerythritol is ester bonded to a fatty acid residue. The pentaerythritol ester includes a pentaerythritol tetraester in which all four terminal substituents are ester bonded to a fatty acid residue and partial esters, that is, a pentaerythritol monoester, a pentaerythritol diester, and a pentaerythritol triester in which any of terminal substituents are ester bonded to a fatty acid residue.

In the pentaerythritol ester according to the present invention, the fatty acid residue is not particularly limited and examples include fatty acid residues having 6 to 22 carbon atoms such as stearic acid residue and oleic acid residue. As examples of the fatty acid residue, caprylic acid, capric acid, oleic acid, stearic acid, myristic acid, palmitic acid, linoleic acid, adipic acid, pelargonic acid, tall oil fatty acid, palm fatty acid, coconut fatty acid, and beef tallow fatty acid can be given.

The friction coefficient of the lubricant for shock absorbers can be adjusted by adjusting the number of the carbon atoms of the fatty acid residue of the pentaerythritol ester. More specifically, as the number of the carbon atoms of the fatty acid residue of the pentaerythritol ester is larger, the friction coefficient of the resulting lubricant for shock absorbers tends to be smaller, while as the number of the carbon atoms of the fatty acid residue is smaller, the friction coefficient of the resulting lubricant for shock absorbers tends to be larger. In order to obtain a lubricant for shock absorbers having a desired friction coefficient, it is therefore possible to select an appropriate pentaerythritol ester, paying attention to the number of the carbon atoms of the fatty acid residue which the pentaerythritol ester has. It is also possible to adjust the friction coefficient of a lubricant for shock absorbers by using, in combination, a plurality of pentaerythritol esters having fatty acid residues different in carbon number. For example, the friction coefficient of the lubricant for shock absorbers can be adjusted by adjusting the mixing amount of a pentaerythritol ester having a fatty acid residue with a small carbon number and a pentaerythritol tetraester having a fatty acid residue with a large carbon number.

In the lubricant for shock absorbers according to the present invention, the pentaerythritol ester is characterized in that it is "composed mainly of a pentaerythritol tetraester". The term the pentaerythritol ester "composed mainly of a pentaerythritol tetraester" as used herein means a pentaerythritol ester containing the pentaerythritol tetraester in the largest amount or in an amount of 50% or more, among a pentaerythritol monoester, a pentaerythritol diester, a pentaerythritol triester, and the pentaerythritol tetraester.

In preparing a pentaerythritol tetraester, it is technically difficult to prepare a pure pentaerythritol tetraester and it may inevitably contain a pentaerythritol monoester, a pentaerythritol diester, and/or a pentaerythritol triester. A product commercially available under the name "pentaerythritol tetraester" is not composed solely of a pentaerythritol tetraester but mainly contains a pentaerythritol tetraester but also contains, in addition thereto, a pentaerythritol triester, a pentaerythritol diester, and/or a pentaerythritol monoester. A pentaerythritol ester commercially available as "pentaerythritol tetraester" may also be defined as a pentaerythritol ester "composed mainly of a pentaerythritol tetraester" in the present invention.

The pentaerythritol ester "composed mainly of a pentaerythritol tetraester" can also be defined as follows. A pentaerythritol ester containing a pentaerythritol triester, a pentaerythritol diester, and/or a pentaerythritol monoester as well as a pentaerythritol tetraester and having an average number of ester groups of more than 3 as a result of the analysis of the ester group can also be specified as the pentaerythritol ester "composed mainly of a pentaerythritol tetraester". A pentaerythritol ester having an average number of hydroxyl groups of less than 1 as a result of the analysis of the hydroxyl group of the pentaerythritol ester may be specified as the pentaerythritol ester "composed mainly of a pentaerythritol tetraester". The average number of ester groups or hydroxyl groups of a pentaerythritol ester can be determined, for example, by gas chromatographic mass analysis or liquid chromatographic mass analysis.

The lubricant for shock absorbers according to the present embodiment mainly contains a hydroxyl-free pentaerythritol tetraester as the pentaerythritol ester but it partially contains a hydroxyl-containing pentaerythritol triester, pentaerythritol diester, and/or pentaerythritol monoester. The hydroxyl value of the lubricant including these hydroxyl-containing pentaerythritol is preferably 0.5 mgKOH/g or more, more preferably 1.0 mgKOH/g or more, still more preferably 1.5 mgKOH/g or more.

The lubricant for shock absorbers having a hydroxyl value adjusted to 0.5 mgKOH/g or more causes less decomposition of pentaerythritol (deterioration in the lubricant for shock absorbers due to the decomposition of pentaerythritol) and therefore has improved wear resistance. FIG. 1 is a graph showing the relation between the hydroxyl value of lubricants for shock absorbers and the degree of deterioration of the lubricants for shock absorbers. In the example shown in FIG. 1, the amount of a pentaerythritol ester added was adjusted and the degree of deterioration of lubricants for shock absorbers, that is, a lubricant for shock absorbers having a hydroxyl value of 0 mgKOH/g (Sample 1), a lubricant for shock absorbers having a hydroxyl value of 0.58 mgKOH/g (Sample 2), a lubricant for shock absorbers having a hydroxyl value of 1.16 mgKOH/g (Sample 3), and a lubricant for shock absorbers having a hydroxyl value of 1.74 mgKOH/g (Sample 4) was determined as shown below in Table 1. The degree of deterioration of each of the aforesaid lubricants for shock absorbers was determined using a FALEX-LFW1 tester, a Block on Ring type friction and wear tester, feeding 250 ml of the lubricant for shock absorbers to the sliding part, sliding it at a speed of 0.6 m/s under a load of 6581 N to conduct the operation of the shock absorber equivalent to 2 million times, and then, removing the resulting sludge by a centrifugal separator.

TABLE 1

|  | Hydroxyl value (mgKOH/g) | Degree of deterioration (%) |
| --- | --- | --- |
| Sample 1 | 0 | 100 |
| Sample 2 | 0.58 | 55 |
| Sample 3 | 1.16 | 25.2 |
| Sample 4 | 1.74 | 9.1 |

As shown in FIG. 1 and Table 1, the degree of deterioration of the lubricant for shock absorbers was suppressed to 55% even in the operation of the shock absorber equivalent to 2 million times by increasing the amount of a pentaerythritol ester added to adjust the hydroxyl value of the lubricant for shock absorbers to 0.58 mgKOH/g. The degree of deterioration of the lubricant for shock absorbers was suppressed to less than 10%, more specifically, 9.1%, even in the operation of the shock absorber equivalent to 2 million times by further increasing the amount of a pentaerythritol ester added to adjust the hydroxyl value of the lubricant for shock absorbers to 1.74 mgKOH/g. Thus, the results have revealed that the lubricant for shock absorbers having a higher hydroxyl value tends to have a smaller degree of deterioration. In particular, from the standpoint of suppressing the deterioration of the lubricant for shock absorbers, the hydroxyl value of the lubricant for shock absorbers is preferably 0.5 mgKOH/g or more, more preferably 1.0 mgKOH/g or more, still more preferably 1.5 mgKOH/g or more.

Figure 2:
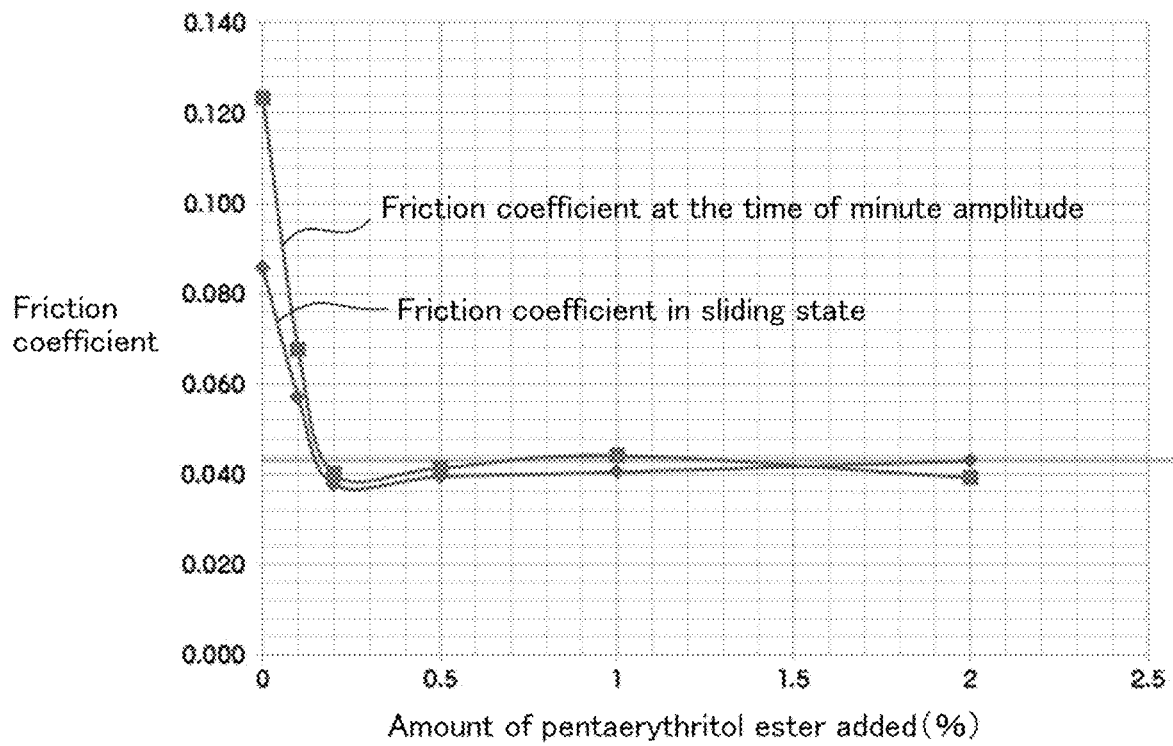
FIG. 2 is a graph showing the relation between the friction coefficient of a ZnDTP-added lubricant for shock absorbers and an amount of pentaerythritol added.

Next, the content of the pentaerythritol ester will be described. The lubricant for shock absorbers according to the present embodiment contains 0.5 mass % or more of the pentaerythritol ester, more preferably 1.0 mass % or more. FIG. 2 is a graph showing the relation between the friction coefficient of the ZnDTP-added lubricant for shock absorbers and the content of the pentaerythritol ester. As shown in FIG. 2, when a pentaerythritol ester content is adjusted to 0.2 mass % or more, the friction coefficient of the ZnDTP-added lubricant for shock absorbers remains unchanged and can be restricted within a range of 0.02 to 0.05. Thus, by adjusting the pentaerythritol ester content to 0.2 mass % or more, the variation of the friction coefficient of the ZnDTP-containing lubricant for shock absorbers can be suppressed. In consideration of the decomposition of the pentaerythritol ester, the pentaerythritol ester content of the lubricant for shock absorbers according to the present embodiment is therefore adjusted to 0.5 mass % or more, preferably 1.0 mass % or more.

Figure 3:
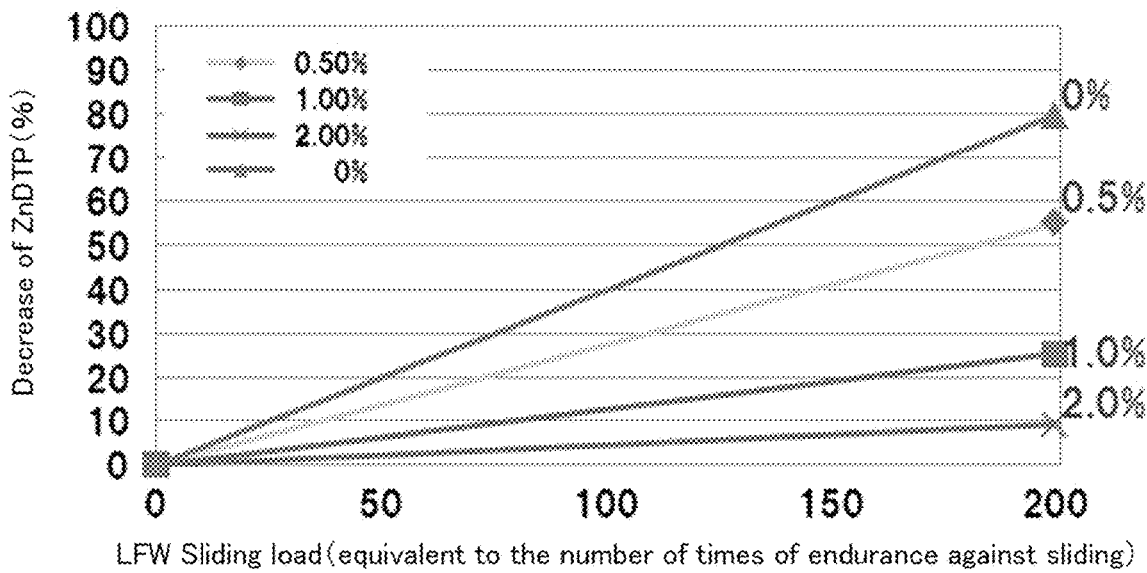
FIG. 3 is a graph showing the relation between a decrease of ZnDTP and an amount of pentaerythritol added.

Further, the lubricant for shock absorbers more preferably contains 2.0 mass % or more of the pentaerythritol ester, because when it does not contain the pentaerythritol ester, the ZnDTP decreases due to decomposition or the like and the friction coefficient of the lubricant for shock absorbers increases to cause wear. FIG. 3 is a graph showing the relation between a decrease in ZnDTP and an amount of pentaerythritol added. In the example shown in FIG. 3, a ZnDTP content was determined as in FIG. 1 by using a FALEX-LFW1 tester, that is, a Block on Ring type friction and wear tester, feeding 250 ml of a lubricant additive to the sliding part, sliding it at a speed of 0.6 m/s under a load of 6581 N to conduct the operation of the shock absorber equivalent to 2 million times, removing the resulting sludge by a centrifugal separator, and then using FT-IR. As shown in FIG. 3, when pentaerythritol was not added, a decrease in ZnDTP reached about 80% in the operation of the shock absorber equivalent to 2 million times. On the other hand, when 0.5 mass % of pentaerythritol was added, a decrease in ZnDTP was suppressed to about 55% in the operation of the shock absorber equivalent to 2 million times; when 1.0 mass % of pentaerythritol was added, a decrease in ZnDTP was suppressed even to about 25% in the operation of the shock absorber equivalent to 2 million times; and when 2.0 mass % of pentaerythritol was added, a decrease in ZnDTP was suppressed even to about 9% in the operation of the shock absorber equivalent to 2 million times. Thus, a lubricant for shock absorbers containing 2.0 mass % or more of a pentaerythritol ester is less deteriorated because a decrease in ZnDTP can be suppressed effectively.

Further, the lubricant for shock absorbers according to the present embodiment preferably contains 5.0 mass % or more of a pentaerythritol ester. The reason for it is because, as shown in FIG. 1, the lubricant for shock absorbers preferably has a hydroxyl value of 0.5 mgKOH/g or more to suppress the deterioration of the lubricant for shock absorbers, but the pentaerythritol ester contained in the lubricant for shock absorbers according to the present embodiment mainly contains a hydroxyl-free pentaerythritol tetraester and in order to provide a lubricant for shock absorbers having a hydroxyl value of 0.5 mgKOH/g or more, the pentaerythritol ester content is preferably adjusted to 5 mass % or more.

EXAMPLES

Examples of the lubricant for shock absorbers according to the present embodiment will next be described.
[Friction Tester 10]

Figure 4:
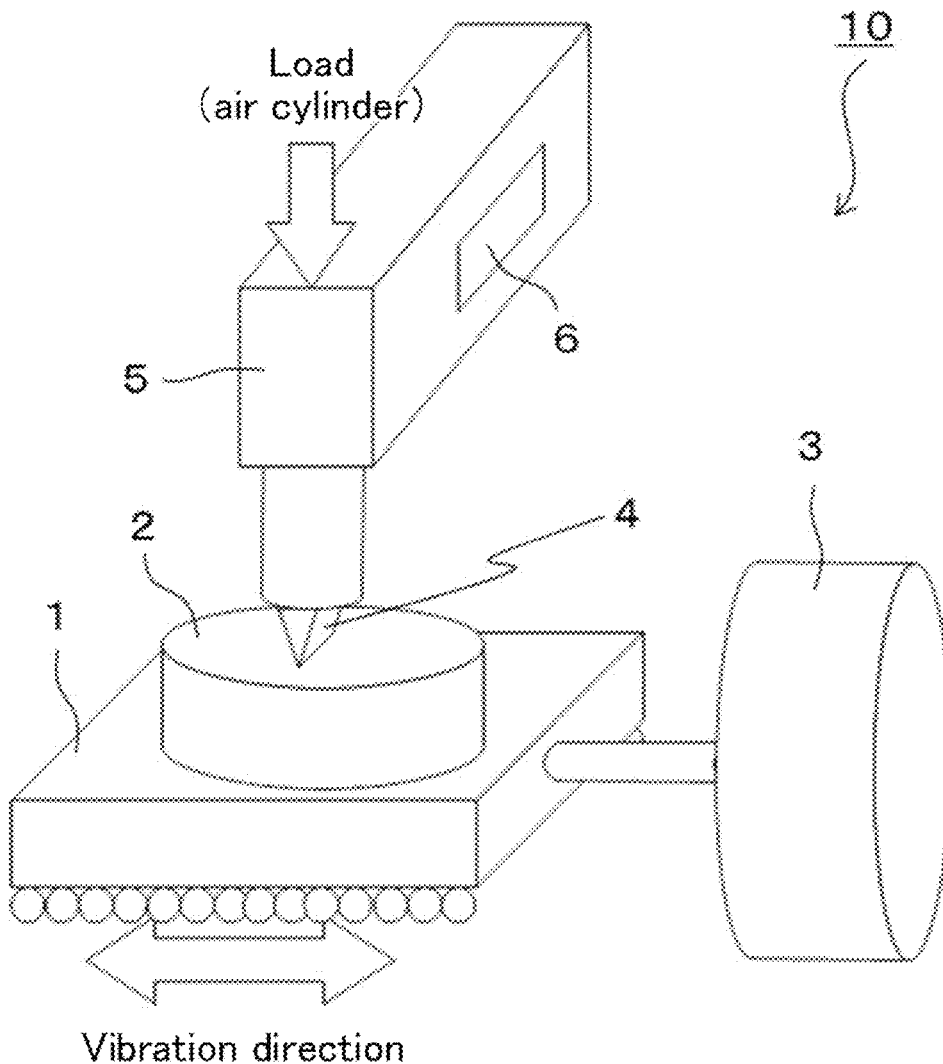
FIG. 4 shows one example of a friction tester used in present Example.

FIG. 4 is a block diagram of a friction tester 10 used in the friction test in the present Example. The friction tester 10 is a pin-on-disk friction tester and it reciprocates a disk specimen 2 fixed on a slide bearing 1 by an electromagnetic exciter 3 and measures the friction force, which has been generated by sliding the disk specimen 2 while pressing a pin specimen 4 against it, by using a strain gauge 6 attached to a fixing shaft 5 of the pin specimen 4. Since a combination of a lubricant for shock absorbers and an oil seal serves as the factor that affects the friction characteristics of shock absorbers, an acrylonitrile butadiene rubber (NBR) to be used as an oil seal in a shock absorber is used as the pin specimen 4 and the pin specimen 4 is cut at the tip thereof so that it would have an angle of 140° to resemble an oil lip in the friction tester 10 shown in FIG. 4. The disk specimen 2 is coated with a hard chrome plating film which is also applied to the surface of a piston rod. In the present Example, the friction force (friction coefficient) between the NBR pin specimen 4 and the chrome-plated disk specimen 2 is measured, but the friction force (friction coefficient) between a copper ball and the chrome-plated disk specimen 2 may be measured.
[Friction Test 1]

Figure 5:
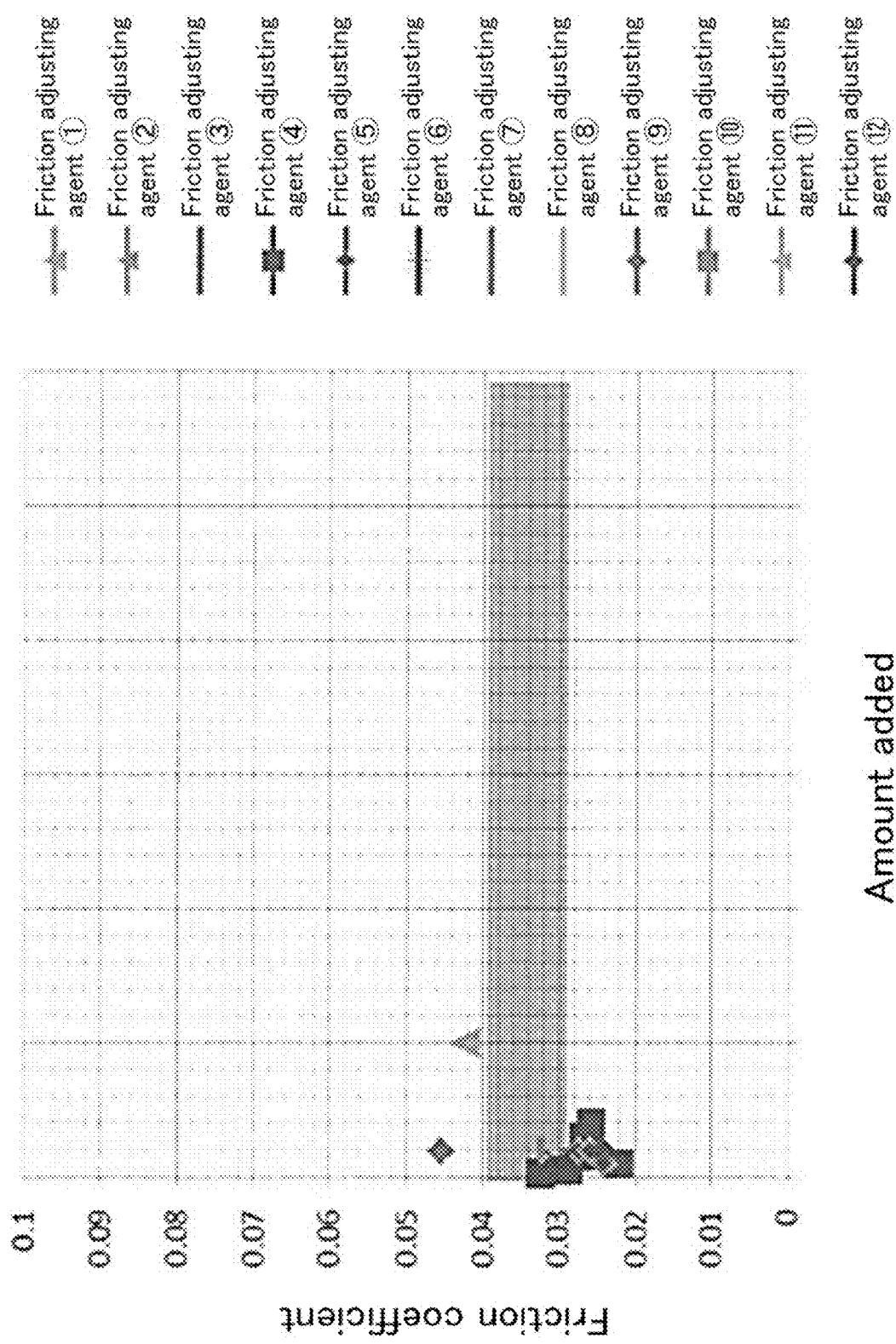
FIG. 5 is a graph showing the relation between the friction coefficient of a ZnDTP-free lubricant for shock absorbers and an amount of various friction adjusting agents added.
Figure 6:
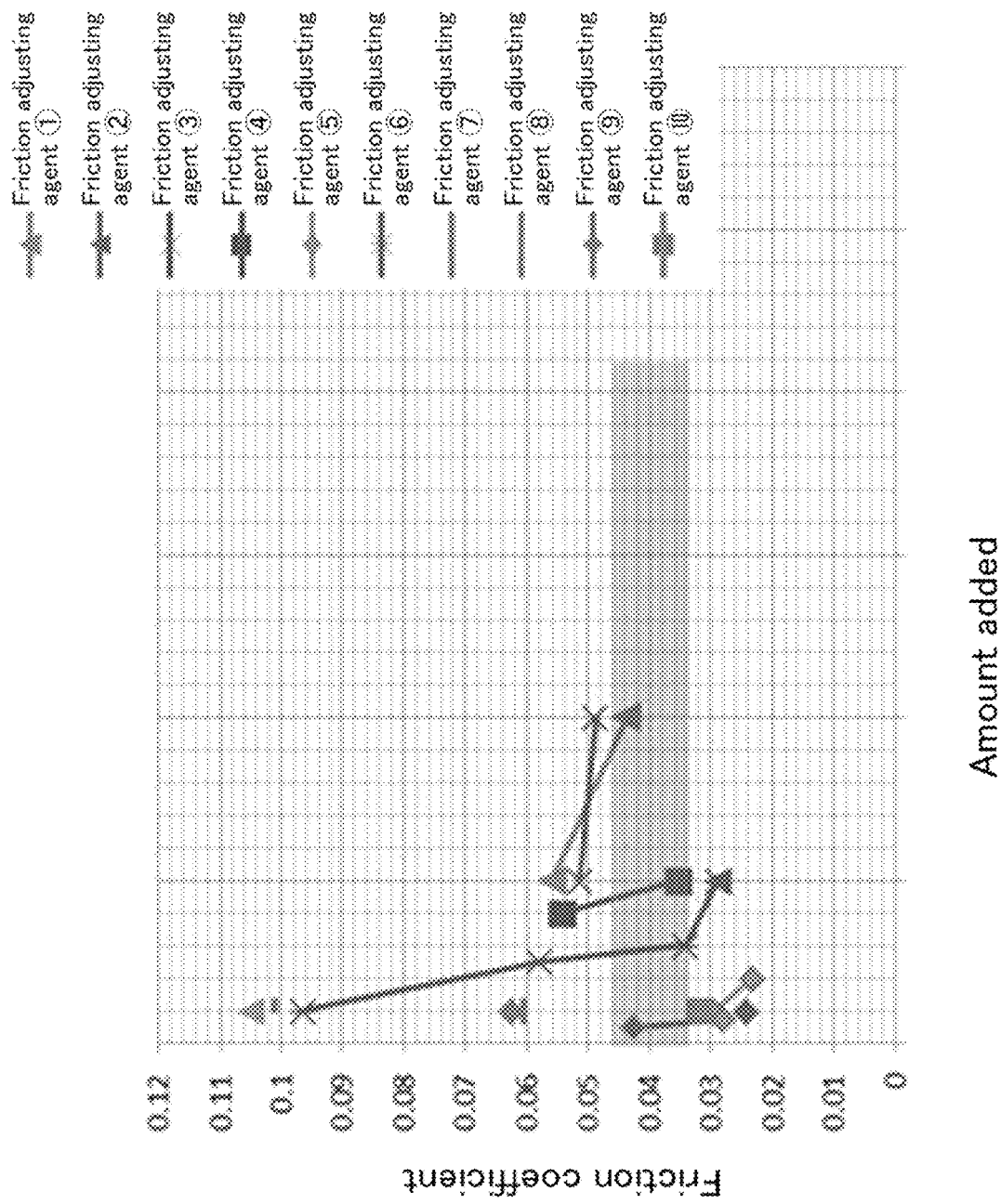
FIG. 6 is a graph showing the relation between the friction coefficient of a ZnDTP-added lubricant for shock absorbers and an amount of various friction adjusting agents added.

First, in Friction Test 1, an average friction coefficient was measured by using the aforesaid friction tester 10 and reciprocating the pin specimen 4 and the disk specimen 2 at an amplitude of ±0.2 mm, a frequency of 1.5 Hz, a load of 20 N, and a temperature of 30° C. In addition, in Friction Test 1, the friction coefficient of lubricants for shock absorbers containing a friction adjusting agent such as phosphorus-based, amine-based, or ester-based one was measured in the case where 1% of a ZnDTP was added and in the case where no ZnDTP was added, respectively. FIG. 5 shows the friction coefficient of the ZnDTP-free lubricants for shock absorbers and FIG. 6 shows the friction coefficient of the ZnDTP-added lubricants for shock absorbers. When the friction coefficient of the lubricant for shock absorbers is too small, the operational stability is worse and when it is too large, the ride comfort is worse. It is therefore preferred to adjust the friction coefficient to fall in a range of 0.02 to 0.05. The friction coefficient has conventionally been adjusted by adjusting the amount of a friction adjusting agent added, but when a ZnDTP was not added as shown in FIG. 5, it was difficult to adjust the friction coefficient only by the friction adjusting agent. When a ZnDTP was added as shown in FIG. 6, on the other hand, it became easier to adjust the friction coefficient depending on the amount of the friction adjusting agent added and the friction coefficient was adjusted to fall in an intended range of 0.02 to 0.05.

Thus, the lubricant for shock absorbers according to the present invention can adjust the friction coefficient of the lubricant for shock absorbers in a range of 0.02 to 0.05 in which both the operational stability and ride comfort can be satisfied by containing a ZnDTP in the friction adjusting agent. This makes it possible to achieve both the operational stability and ride comfort.
[Friction Test 2]

Figure 7:
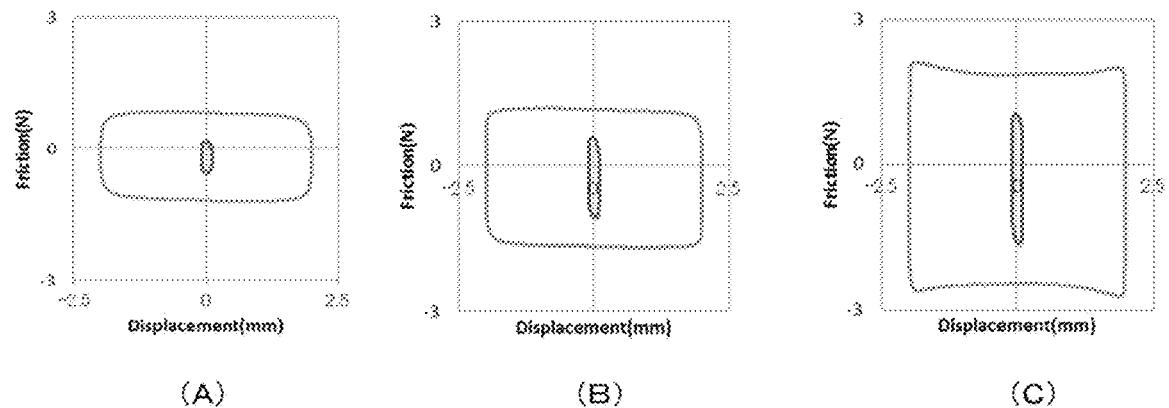
FIG. 7 shows the results of a friction test using a lubricant composition for shock absorbers mainly containing a pentaerythritol monoester, a pentaerythritol diester, or a pentaerythritol triester (Comparative Examples).
Figure 8:
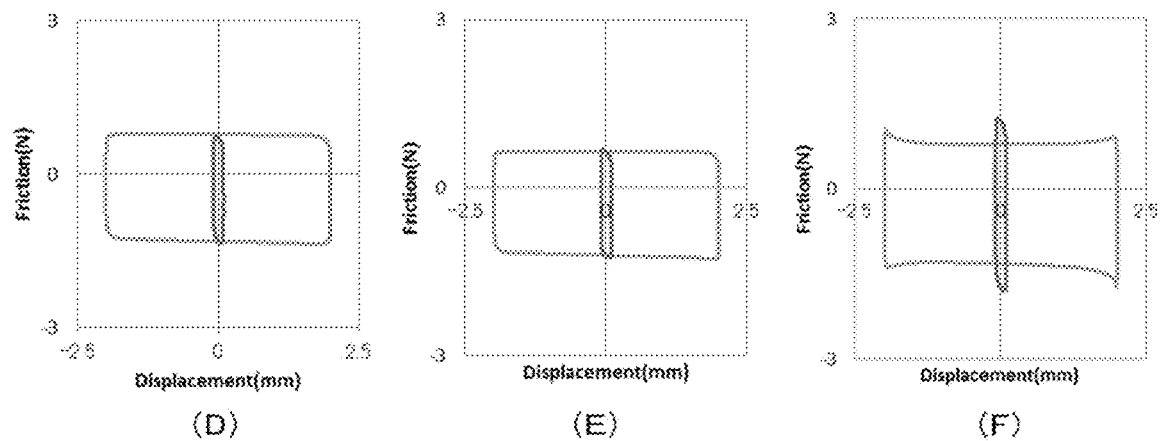
FIG. 8 shows the results of a friction test using a lubricant composition for shock absorbers mainly containing a pentaerythritol tetraester (Example).
Figure 9:
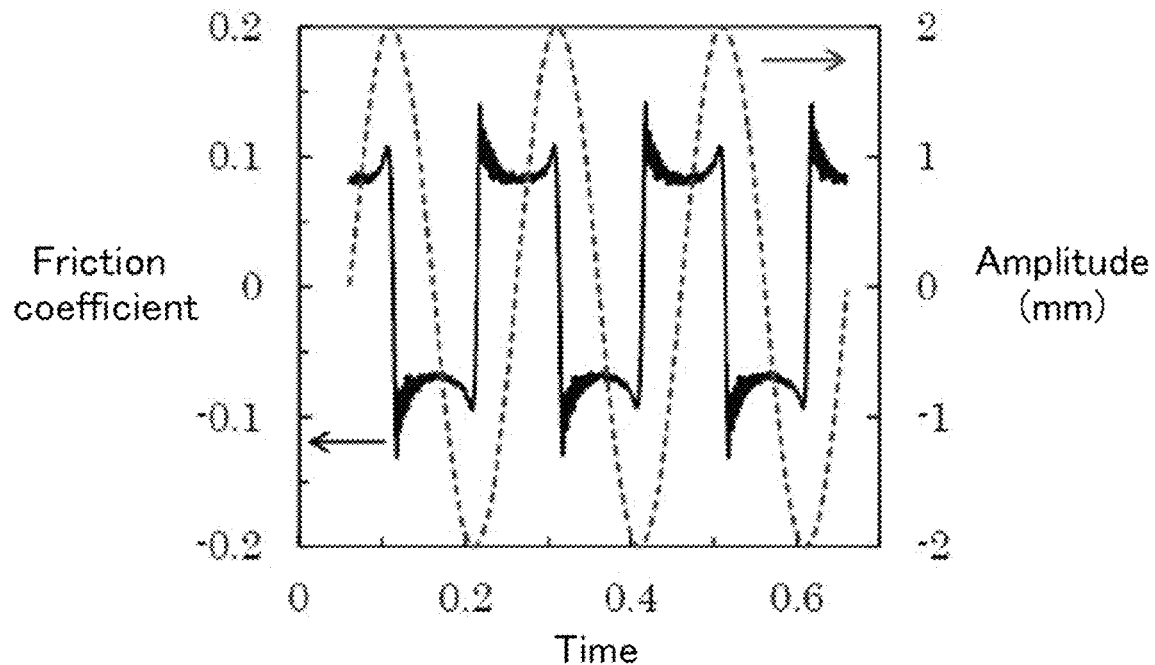
FIG. 9 is a conventional graph showing variation in the friction coefficient of a lubricant for shock absorbers in a friction test.

In Friction Test 2, the friction coefficient of a lubricant for shock absorbers in each of the following test plots was measured by using the aforesaid friction tester 10 and sliding at two amplitudes, that is, a minute amplitude (amplitude: ±0.2 mm) and a normal amplitude (amplitude: ±2.0 mm), at a frequency of 1.5 Hz, a load of 20 N, and a temperature of 30° C. In addition, Friction Test 2 was performed by changing only the kind of a pentaerythritol ester added to the lubricant for shock absorbers. FIG. 7 and FIG. 8 show the test results. FIGS. 7(A) to (C) show the test results of the lubricant for shock absorbers to which pentaerythritol mainly containing a pentaerythritol monoester, a pentaerythritol diester, or a pentaerythritol triester was added (Comparative Example). FIGS. 8(D) to (F) show the test results of the lubricant for shock absorbers according to the present embodiment to which a pentaerythritol ester mainly containing a pentaerythritol tetraester was added (Example). In FIGS. 7 and 8, by assigning a positive value to the friction force of the lubricant for shock absorbers and the amplitude of the shock absorber in the forward sliding direction of the shock absorber and assigning a negative value to the friction force of the lubricant for shock absorbers and the amplitude of the shock absorber in the backward sliding direction, the friction characteristics of the lubricant for shock absorbers are indicated as a circulating graphic, though the friction characteristics are conventionally indicated as in FIG. 9.

As shown in FIGS. 7(A) to (C), when the lubricants for shock absorbers not mainly containing a pentaerythritol tetraester (Comparative Examples) were used, the friction coefficient is relatively small at the time of a minute amplitude and relatively large at the time of a normal amplitude. In other words, the lubricants for shock absorbers not mainly containing a pentaerythritol tetraester (Comparative Examples) tend to have a larger friction coefficient, depending on the amplitude. This suggests that at the time of a minute amplitude, the operational stability may not be sufficient due to a small friction force, while at the time of a normal amplitude, a friction force may become too large to deteriorate the ride comfort.

In contrast, as shown in FIGS. 8(D) to (F), it has been found that in the lubricants for shock absorbers mainly containing a pentaerythritol tetraester according to the present embodiment, the friction coefficient at the time of a minute amplitude and the friction coefficient at the time of a normal amplitude are almost equal to each other. Thus, the lubricant for shock absorbers according to the present embodiment mainly containing a pentaerythritol tetraester (Example) provides, even at the time of a minute amplitude, a friction force comparable to that at the time of a normal amplitude, so that the operational stability at the time of a minute amplitude can be improved. The vibration itself input into shock absorbers is small at the time of a minute amplitude, so that good ride comfort can be maintained even if the friction force becomes larger than that of Comparative Examples. This means that the lubricant for shock absorbers mainly containing a pentaerythritol tetraester according to the present embodiment (Example) can satisfy both the operational stability and ride comfort at the time of a minute amplitude.

The friction coefficient of the lubricant for shock absorbers mainly containing a pentaerythritol tetraester according to the present embodiment (Example) becomes smaller at the time of a normal amplitude, compared with that of the lubricants for shock absorbers (Comparative Examples) shown in FIG. 7. This suggests that the friction force of the lubricant for shock absorbers mainly containing a pentaerythritol tetraester (Example) becomes smaller than that of Comparative Examples when vibration with a large amplitude occurs during rough road running, so that the vibration damping force can be reduced and ride comfort can be improved.

Figure 10:
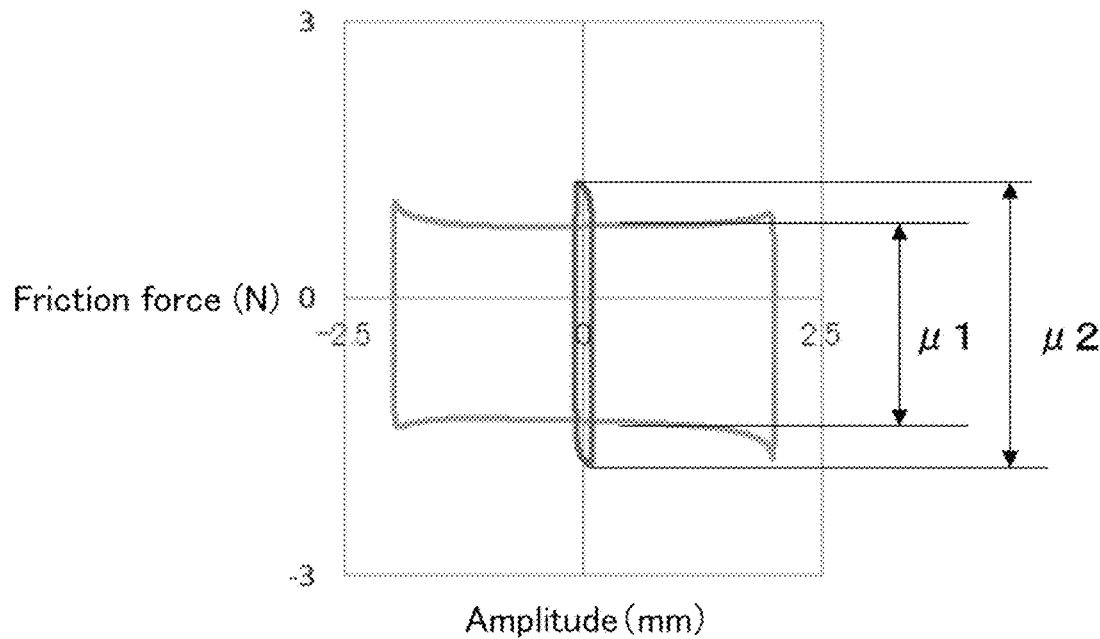
FIG. 10 is a diagram for explaining an amplitude-dependent index.

Further, in the lubricant for shock absorbers mainly containing a pentaerythritol tetraester according to the present embodiment, assuming that a friction coefficient at the time of a minute amplitude is $\mu2$ and a friction coefficient at the time of a normal amplitude is $\mu1$ as shown in FIG. 10, a ratio of the friction coefficient $\mu1$ at the time of a normal amplitude and the friction coefficient $\mu2$ at the time of a minute amplitude ($\mu2/\mu1$) approximates to 1. In the present invention, this ratio ($\mu2/\mu1$) will be called "amplitude-dependent index". Calculation results of the amplitude-dependent index ($\mu2/\mu1$) of a plurality of lubricants for shock absorbers mainly containing a pentaerythritol tetraester have revealed that the lubricants for shock absorbers mainly containing a pentaerythritol tetraester have an amplitude-dependent index of 0.8 or more, more preferably 0.8 to 1.2. As a result, it has been found that a lubricant for shock absorbers containing pentaerythritol and having an amplitude-dependent index of 0.8 or more, more preferably 0.8 to 1.2 can provide improved operational stability at the time of a minute amplitude and at the same time, provide improved ride comfort at the time of a normal amplitude.

Figure 11:
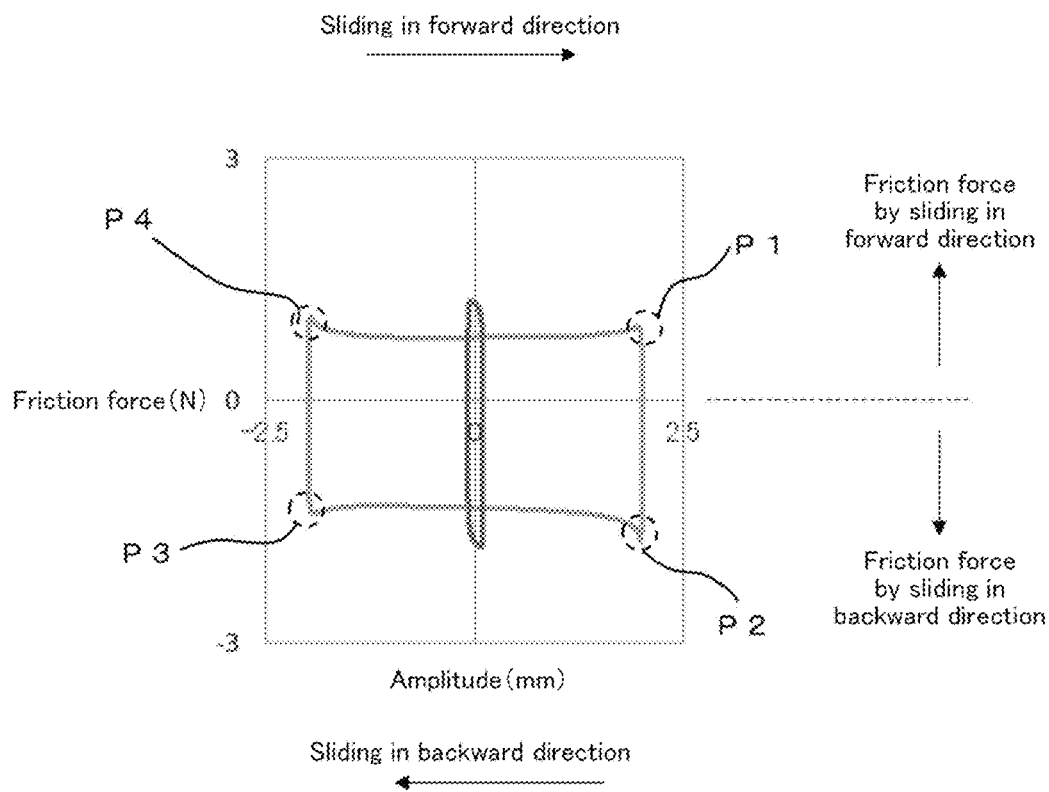
FIG. 11 is a diagram for explaining a spike index.

It has been found from Friction Test 2 that the lubricant for shock absorbers according to the present embodiment improves the tire grounding performance and thereby enhances operational stability. This means that in the lubricants for shock absorbers mainly containing pentaerythritol tetraester according to the present embodiment (Example) shown in FIG. 8, compared with the lubricants for shock absorbers (Comparative Examples) shown in FIG. 7, as shown at P1 to P4 in FIG. 11, the friction force at P1 and P3 immediately before the transition from the sliding state to the stationary state and at P2 and P4 immediately after the transition from the stationary state to the sliding state becomes higher than that in the sliding state, at the time of a normal amplitude. Thus, by adjusting the amplitude-dependent index to 0.8 or more, more preferably 1 or more, the friction force at P1 and P3 immediately before the transition from the sliding state to the stationary state and at P2 and P4 immediately after the transition from the stationary state to the sliding state can be made larger and as a result, the vibration damping force at the time of transition of the state can be made larger. Since the friction force of a lubricant for shock absorbers immediately before sliding is stopped or immediately after sliding is started becomes larger and the vibration damping force strongly works immediately though the sliding direction changes, a tire grounding force works to improve the tire grounding performance.

[Friction Test 3]

Figure 12:
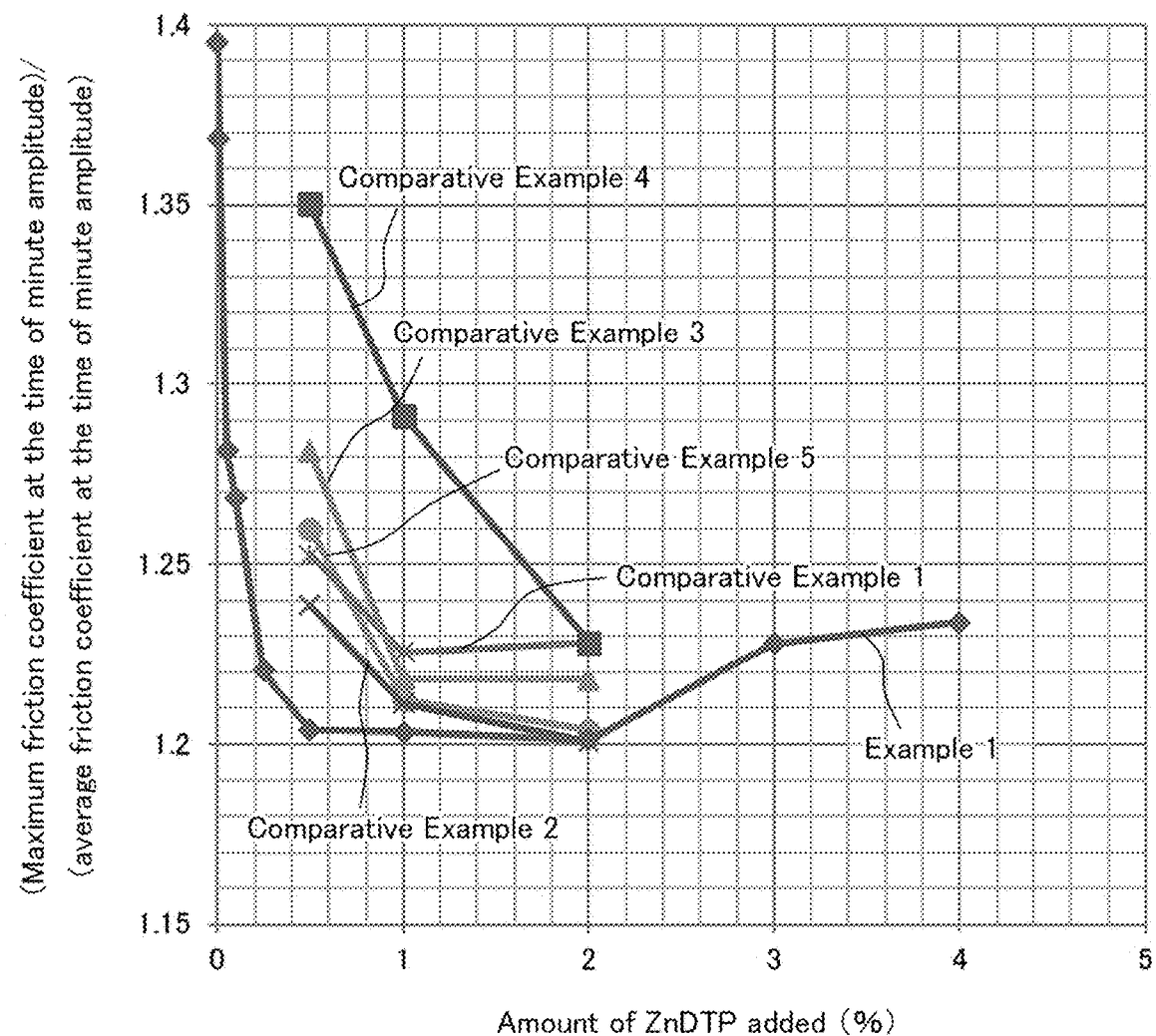
FIG. 12 is a graph showing the friction characteristics of lubricants for shock absorbers according to the kind of ZnDTP.

In Friction Test 3, the friction coefficient of a lubricant for shock absorbers was determined by reciprocating a pin specimen 4 and a disk specimen 2 at an amplitude of ±0.1 mm, a frequency of 5 Hz, 20 N, and 30° C. In addition, in Friction Test 3, as shown in FIG. 12, the friction coefficient of the lubricants for shock absorbers of Comparative Examples 1 to 4 as well as that of the lubricant for shock absorbers of Example 1 according to the present embodiment (lubricant for shock absorbers containing a first ZnDTP having a primary alkyl group and a secondary alkyl group) was determined. Comparative Example 1 is an example of a lubricant for shock absorbers containing a ZnDTP having only a primary alkyl group with 3, 5 carbon atoms; Comparative Example 2 is an example of a lubricant for shock absorbers containing a ZnDTP having only a secondary alkyl group with 3, 5 carbon atoms; Comparative Example 3 is an example of a lubricant for shock absorbers containing a ZnDTP having only a secondary alkyl group with 6, 8 carbon atoms; Comparative Example 4 is an example of a lubricant for shock absorbers containing a ZnDTP having only a primary alkyl group with 8 carbon atoms; and Comparative Example 5 is an example of a lubricant for shock absorbers containing a 1:1 mixture of a ZnDTP having only a secondary alkyl group with 3, 6 carbon atoms and a ZnDTP having only a primary alkyl group with 8 carbon atoms.

In Friction Test 3, the maximum friction coefficient and the average friction coefficient in Example 1 and Comparative Examples 1 to 5 were determined at varied amounts of ZnDTP added (wt %). Further, (maximum friction coefficient)/(average friction coefficient) was calculated and the (maximum friction coefficient)/(average friction coefficient) ratio thus obtained was plotted for each amount of ZnDTP added (wt %).

FIG. 12 shows the results of Friction Test 3. The lubricant for shock absorbers having a (maximum friction coefficient)/(average friction coefficient) ratio closer to 1 can be assessed as having less variation in friction coefficient and providing good ride comfort. The results of FIG. 12 show that in Comparative Examples 1 to 5, when the amount of ZnDTP added was 1.0 wt % or less, the (maximum friction coefficient)/(average friction coefficient) ratio became substantially higher than that of Example 1 and when the amount of ZnDTP added was 1.0 wt % or more, the (maximum friction coefficient)/(average friction coefficient) ratio also became higher than that of Example 1. On the other hand, the overall (maximum friction coefficient)/(average friction coefficient) ratio tended to be lower in Example 1 than that in Comparative Examples 1 to 5. In particular, when the amount of ZnDTP added was 0.5 to 1.0 wt %, the (maximum friction coefficient)/(average friction coefficient) ratio was significantly lower than that in Comparative Examples 1 to 5.

Further, in Example 1, when the amount of ZnDTP added was 0.1 to 4.0 wt %, the (maximum friction coefficient)/(average friction coefficient) ratio was 1.3 or less, while when the amount was 0.25 to 2.0 wt %, the (maximum friction coefficient)/(average friction coefficient) ratio was 1.22 or less. This has revealed that the lubricant for shock absorbers containing the first ZnDTP having a primary alkyl group and a secondary alkyl group according to the present embodiment provided improved ride comfort by adjusting the amount of the aforesaid ZnDTP added to 0.25 to 2.0 wt %.

In addition, Friction Test 3 has revealed that the (maximum friction coefficient)/(average friction coefficient) ratio is more likely to vary according to a change in the amount of ZnDTP added in Comparative Examples 1 to 5 than in Example 1, while the (maximum friction coefficient)/(average friction coefficient) ratio is unlikely to vary in Example 1 even if the amount of ZnDTP added changes. For example, in Example 1, when the amount of ZnDTP added was in a range of 0.2 to 4.0 wt %, the (maximum friction coefficient)/(average friction coefficient) ratio remained at 1.24 or less. This has revealed that the lubricant for shock absorbers containing the first ZnDTP having a primary alkyl group and a secondary alkyl group according to the present embodiment is more effective for preventing a change in ride comfort than those of Comparative Examples 1 to 5 even when the deterioration (decomposition) of the ZnDTP proceeds and a content of the ZnDTP decreases after a long period of use.

In order to find whether a lubricant for shock absorbers capable of providing improved ride comfort should be a lubricant for shock absorbers containing a ZnDTP (first ZnDTP) having both a primary alkyl group and a secondary alkyl group, like the lubricant for shock absorbers according to the present invention (Example 1) or it may be a lubricant for shock absorbers containing a mixture of a ZnDTP having a primary alkyl group and a ZnDTP having a secondary alkyl group, a friction test was also made using, as Comparative Example 5, a lubricant for shock absorbers containing a mixture of a ZnDTP having a primary alkyl group and a ZnDTP having a secondary alkyl group. As a result, the (maximum friction coefficient)/(average friction coefficient) ratio of the lubricant obtained in Comparative Example 5 did not lower as in Example 1 and ride comfort was not improved. This has suggested that the lubricant for shock absorbers containing a simple mixture of a ZnDTP having a primary alkyl group and a ZnDTP having a secondary alkyl group does not have such an effect of a lubricant for shock absorbers containing a ZnDTP (first ZnDTP) having both a primary alkyl group and a secondary alkyl group as provided by the lubricant for shock absorbers according to the present embodiment (Example 1).

As shown above, the lubricant for shock absorbers according to the present embodiment has the base oil (A) and the friction adjusting agent (B) and the friction adjusting agent (B) contains the first ZnDTP (C) having a primary alkyl group and a secondary alkyl group. The lubricant for shock absorbers containing the friction adjusting agent can easily adjust a friction coefficient to be suited for good ride comfort and operational stability. In addition, compared with a lubricant for shock absorbers containing a ZnDTP having only a primary alkyl group and/or a ZnDTP having only a secondary alkyl group, the lubricant for shock absorbers according to the present embodiment can suppress variation in friction coefficient and provide more improved ride comfort.

[Running Test 1]

Expert drivers (professional drivers) and general drivers were asked to assess a vehicle equipped with a shock absorber for which the lubricants for shock absorbers not mainly containing a pentaerythritol tetraester (Comparative Examples) was used and a vehicle equipped with a shock absorber for which the lubricant for shock absorbers mainly containing a pentaerythritol tetraester (Example) was used after running the vehicles on the same running course under the same conditions except for the shock absorber used.

As a result, compared with the vehicle for which the lubricant of Comparative Example was used, the vehicle for which the lubricant for shock absorbers mainly containing a pentaerythritol tetraester (Example) was used was assessed as having better tire turning performance and tire grounding performance and thereby having improved operability, on a road with fewer bumps. Not only expert drivers but also general drivers experienced such an assessment. It has also been found that when the lubricant for shock absorbers mainly containing a pentaerythritol tetraester (Example) is used, a vibration damping force increases, so that even slight unevenness on a road is likely to be transmitted to drivers and thus, much information can be given to the drivers.

Preferred embodiment examples of the present invention were described above, but the technical scope of the present invention is not limited to or by the aforesaid embodiment. Various changes or modifications can be added to the aforesaid embodiment examples and embodiments to which such a change or modification has been added are also embraced in the technical scope of the present invention.

The invention claimed is:

1. A lubricant composition for shock absorbers, comprising:
   a base oil, a friction adjusting agent and zinc dithiophosphate, wherein
   the friction adjusting agent contains a pentaerythritol ester,
   the pentaerythritol ester is a mixture of a pentaerythritol tetraester and a pentaerythritol ester other than the pentaerythritol tetraester,
   the mixture of the pentaerythritol ester contains a pentaerythritol tetraester at the largest proportion,
   a content of the pentaerythritol ester is 0.5 mass % or more, and
   the zinc dithiophosphate has an alkyl group having 3 to 5 carbon atoms.

2. The lubricant composition for shock absorbers according to claim 1, wherein the mixture of pentaerythritol tetraester and the pentaerythritol ester other than the pentaerythritol tetraester has an average number of an ester group of more than 3.

3. The lubricant composition for shock absorbers according to claim 1, wherein the mixture of pentaerythritol tetraester and the pentaerythritol ester other than the pentaerythritol tetraester has an average number of a hydroxyl group of less than 1.

4. The lubricant composition for shock absorbers according to claim 1, wherein a ratio of a friction coefficient $\mu2$ at the time of a minute amplitude and a friction coefficient $\mu1$ at the time of a normal amplitude ($\mu2/\mu1$) is 0.8 or more.

5. The lubricant composition for shock absorbers according to claim 1, wherein a friction coefficient $\mu3$ of a lubricant immediately before sliding is stopped or immediately after sliding is started is larger than a friction coefficient $\mu4$ of the lubricant in a sliding state.

6. The lubricant composition for shock absorbers according to claim 1, wherein a hydroxyl value is 0.5 mgKOH/g or more.

7. The lubricant composition for shock absorbers according to claim 1, wherein a content of the pentaerythritol ester is 5 mass % or more.

8. A shock absorber using the lubricant composition for shock absorbers according to claim 1.

\* \* \* \* \*